US008977958B2

(12) United States Patent
Deyo et al.

(10) Patent No.: US 8,977,958 B2
(45) Date of Patent: *Mar. 10, 2015

(54) COMMUNITY-BASED SOFTWARE APPLICATION HELP SYSTEM

(75) Inventors: Roderic C. Deyo, Redmond, WA (US); Christopher Pratley, Seattle, WA (US); Sandeep Sahasrabudhe, Kirkland, WA (US); Sunil Swami, Redmond, WA (US); Jeff Raikes, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1075 days.

This patent is subject to a terminal disclaimer.

(21) Appl. No.: 11/986,159

(22) Filed: Nov. 20, 2007

(65) Prior Publication Data

US 2009/0132918 A1 May 21, 2009

(51) Int. Cl.
*G06F 3/048* (2013.01)
*G06F 9/44* (2006.01)
*G06Q 10/06* (2012.01)
*G06Q 10/10* (2012.01)

(52) U.S. Cl.
CPC .............. *G06F 9/4446* (2013.01); *G06Q 10/06* (2013.01); *G06Q 10/10* (2013.01)
USPC ........................................................ 715/705

(58) Field of Classification Search
CPC ..................................................... G06F 9/4446
USPC ......................................................... 715/705
See application file for complete search history.

(56) References Cited

U.S. PATENT DOCUMENTS

| 5,982,365 | A | 11/1999 | Garcia et al. |
| 6,237,138 | B1 | 5/2001 | Hameluck et al. |
| 6,467,080 | B1 | 10/2002 | Devine et al. |
| 6,484,189 | B1 | 11/2002 | Gerlach, Jr. et al. |
| 6,577,324 | B1 | 6/2003 | Palmer et al. |
| 6,859,799 | B1 * | 2/2005 | Yuen ..................................... 1/1 |
| 7,124,366 | B2 | 10/2006 | Foreman et al. |
| 7,184,918 | B2 | 2/2007 | Hamilton et al. |

(Continued)

OTHER PUBLICATIONS

Farris, D., *Camtasia v. 3.0.1.*, Program overview, Feb. 2002, downloaded from http://www.gtpcc.org/gtpcc/camtasia.htm on Aug. 17, 2007, 8 pages of promotional material.

(Continued)

*Primary Examiner* — Sara England
(74) *Attorney, Agent, or Firm* — Jessica Meyers; Jim Ross; Micky Minhas

(57) ABSTRACT

A framework for enabling a community of users to share help information about an application program. The framework includes a mechanism for users to generate and share help information and a mechanism for users to access help information created by other users. To generate help information, tools may be incorporated into an application to enable users to capture information about the application as they are performing functions. Those tools capture as a video clip a representation of screen displays created by the application as the user interacts with the application to perform a function about which help information is to be generated. Along with the scenes captured in the video clip, application context information and explanatory material, such as an audio narration, can be captured. The mechanism to access help information includes a server to which video clips can be posted and cataloged, allowing identification of clips in response to user input describing a required help topic.

20 Claims, 8 Drawing Sheets

(56) References Cited

U.S. PATENT DOCUMENTS

| | | | |
|---|---|---|---|
| 7,694,885 B1* | 4/2010 | Bourdev | 235/487 |
| 2002/0062357 A1 | 5/2002 | Srinivasan | |
| 2002/0120925 A1* | 8/2002 | Logan | 725/9 |
| 2004/0036715 A1 | 2/2004 | Warren | |
| 2004/0210607 A1* | 10/2004 | Manchanda et al. | 707/203 |
| 2004/0221311 A1* | 11/2004 | Dow et al. | 725/52 |
| 2005/0004890 A1 | 1/2005 | Real et al. | |
| 2005/0027696 A1 | 2/2005 | Swaminathan et al. | |
| 2005/0154985 A1 | 7/2005 | Burkhart et al. | |
| 2005/0182783 A1 | 8/2005 | Vadai et al. | |
| 2007/0294251 A1 | 12/2007 | Vadai et al. | |
| 2007/0300179 A1 | 12/2007 | Friedlander | |
| 2008/0086688 A1* | 4/2008 | Chandratillake et al. | 715/719 |
| 2008/0228774 A1 | 9/2008 | Hamilton et al. | |
| 2008/0250314 A1* | 10/2008 | Larsen | 715/705 |
| 2008/0256399 A1 | 10/2008 | Erdosi et al. | |
| 2009/0009601 A1* | 1/2009 | Li | 348/143 |
| 2009/0113278 A1 | 4/2009 | Denoue et al. | |
| 2009/0132920 A1 | 5/2009 | Deyo et al. | |
| 2009/0150499 A1 | 6/2009 | Partridge et al. | |
| 2009/0228357 A1 | 9/2009 | Turakhia | |

OTHER PUBLICATIONS

ACA Systems, *ACA Screen Recorder 2.03*, downloaded from http://www.acasystems.com/en/screenrecorder/overview.htm on Aug. 17, 2007, 2 pages of promotional material.

Qweas, *321 Soft Screen Video Recorder 1.05*, downloaded from http://www.qweas.com/download/graphics/screen_capture/321soft_screen_video_recorder.htm on Aug. 17, 2007, 2 pages of promotional material.

Topshareware.com, *Replay Screencase 1.1*, downloaded from http://www.topshareware.com/Replay-Screencast-download-38690.htm on Aug. 17, 2007, 2 pages of promotional material.

Office Action from the United States Patent and Trademark Office regarding U.S. Appl. No. 11/986,112 dated Oct. 4, 2010.

Office Action from the United States Patent and Trademark Office regarding U.S. Appl. No. 11/986,112 dated Mar. 15, 2011.

Office Action from the United States Patent and Trademark Office regarding U.S. Appl. No. 11/986,112 dated Apr. 10, 2014, 17 pages.

Office Action from the United States Patent and Trademark Office regarding U.S. Appl. No. 11/986,112 dated Oct. 6, 2014, 17 pages.

TechSmith, Camtasia Studio Online Help version 5.0.0, Oct. 9, 2007, TechSmith, pp. 1-325.

VTC, Online Computer Training & Recruitment, Mar. 15, 2006, VTC, pp. 1-8.

\* cited by examiner

COMMUNITY-BASED SOFTWARE APPLICATION HELP SYSTEM

BACKGROUND

Computers are used extensively in helping individuals to be more productive in their work. A wide variety of computer applications and user interfaces are readily available, providing users with the ability to process data in a number of ways such as in word processing, electronic communications, publishing, presentations, databases, scheduling, and other activities that commonly occur in an office environment. Such applications are readily available within the MICROSOFT® OFFICE® suite of applications, some examples include the WORD® application, which processes data that represents text documents, the EXCEL® application, which processes data that represents spread sheets, the OUTLOOK® application, which processes data that represents e-mail messages, appointments, tasks and the like, the ACCESS® application, which allows for database management, the POWERPOINT® application, which aids in creating slide presentations, and the PUBLISHER® application, which formats design schemes to create professional publications. OFFICE® currently has approximately 500 million users worldwide. The MICROSOFT® WINDOWS® operating system, which processes system data, user input, and manages internal tasks within a computer, has close to a billion users worldwide.

With this number of users, it is not unexpected that some may require assistance in using such applications. Users may obtain assistance in any of a number of ways, including reading a manual or professionally prepared online resources, taking a training class, asking a friend or co-worker who has mastered an application, posting a question to a chat group or consulting a software supplier's customer support organization.

SUMMARY OF INVENTION

In aspects of the present invention, users of an application are able to easily create and share help information with an online community. In this way, users who require application support may be able to draw upon valuable online resources that make up the collective and cooperative knowledge of users anywhere in the world, allowing for a more positive user experience than that which has been available previously.

Help information may be in the form of video clips made available to a global online community. The video clips may be indexed by application and application function depicted in the video clips, allowing users to readily find video clips for topics of interest.

Applications for which community-based help is to be provided may include tools that allow users to easily create help videos. These tools may aid a user in creating a video-clip depicting user interaction with the application while an application is being performed. These tools may also allow the user to incorporate explanatory material, such as text or recorded speech, in conjunction with video images of a computer display as functions are being performed. Moreover, tools may be incorporated to help a user in posting help videos in locations where they can be accessed by other users who are members of a help community. Yet other tools may aid users in searching for help videos that have been created by other members of a help community. To facilitate integration of such tools with an application, the tools may be implemented as an application plug-in for the application about which help is to be provided.

In accordance with one aspect of the invention, tools for creating video clips relating to an application may capture context information about the application during the user interaction depicted in the video clips. This context data may be used to automatically index video clips for easy searching of a database of help videos generated by members of a user community. Consequently, users of such online help screen cast videos will be able to receive immediate instruction for software applications in a manner that emulates the experience of standing over the shoulder of a friend or colleague who is showing them how to solve a particular problem. Users may also contribute to such an online help community by contributing help screen cast videos to an ever growing database upon which others may be able to draw.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
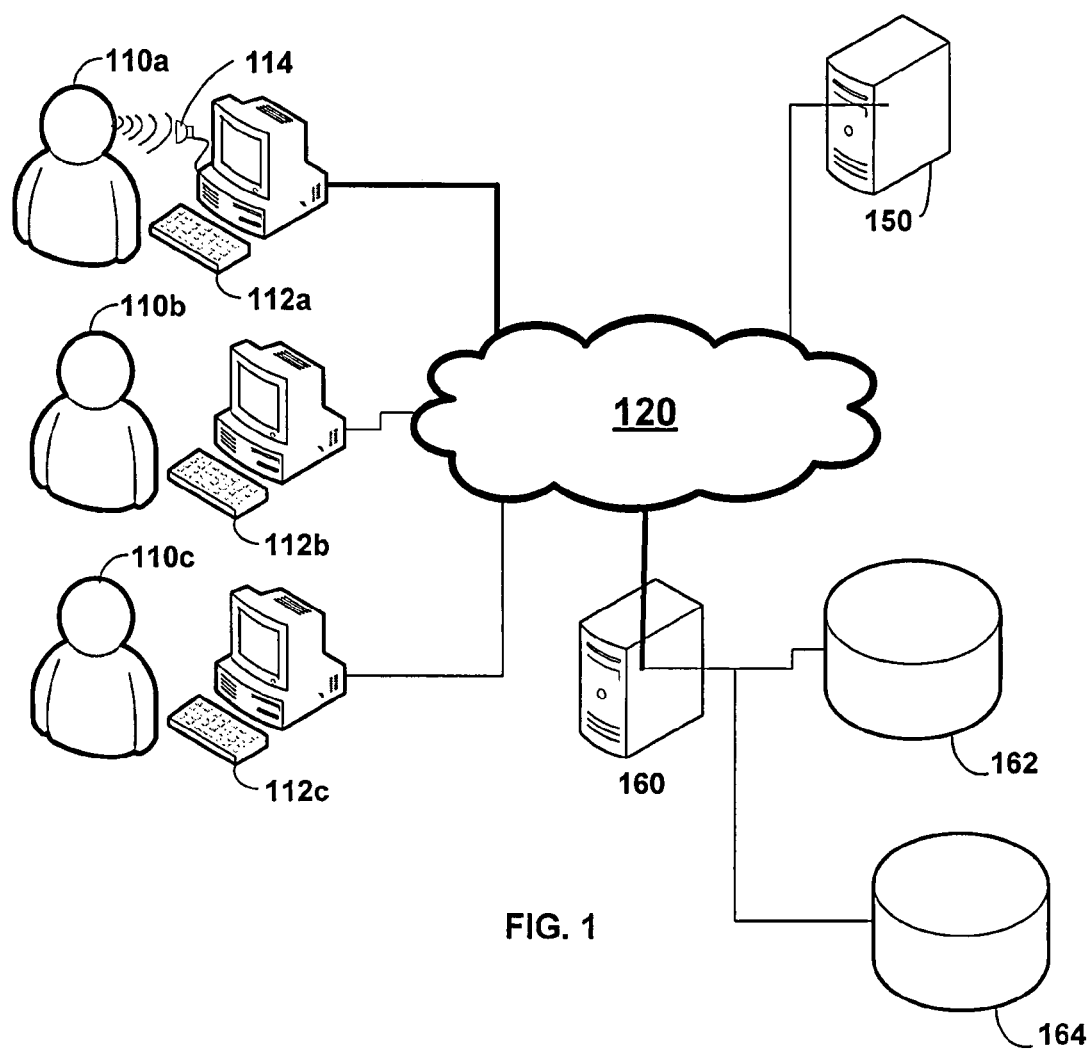
FIG. 1 is a schematic of an online help community for a software application program according to embodiments of the invention.

The inventors have appreciated that currently available options for users to obtain help with application programs suffer from one or more shortcomings that interfere with a user quickly obtaining relevant information. Further, the inventors have appreciated that users frequently are comfortable with and therefore learn rapidly through peer interaction, but current methods of obtaining help information do not always allow help information to be obtained in this fashion.

To make information about one or more applications readily available in a comfortable format, an online help community may be created for one or more application programs. Users may be empowered to create and share help information with the online community by incorporating into an application, about which help is provided, tools that interface to the community. The help information may be automatically indexed for others in the community to search using context information about the application captured as the help information is created. In this manner, a vast array of online help resources immediately may be available to users of that application worldwide.

User help may be provided in the form of screen cast videos, which may be created and made accessible to others within the help community in any suitable fashion. In some embodiments, a client-server based system is used to create and share video clips. Tools on the client may aid a user in creating and sharing help screen cast videos by posting them on the server. The server may be configured to organize the help screen cast videos to facilitate finding help for specific functions associated with specific applications.

Such a system allows the collective learning and knowledge of a multitude of users of various application programs to be shared with other users. Further, the information is presented in a fashion that emulates peer-based collaboration, creating an environment in which users can readily absorb help information. Though help information may be presented in any suitable format, it may be helpful for users to watch video clips that contain screen casts of another user operating the application program and explaining how to operate the program in an appropriate and efficient manner.

Accordingly, one or more of the tools on the client may create video clips or audio-video clips of a user performing an application function, which can provide useful information to other users that want to learn how to perform the same function. The tools may also allow explanatory information to be captured along with the video. The explanatory information could be captured speech, describing steps of performing the application function. In this way, the explanatory information can be synchronized with images depicting the computer display as the function is performed. However, the explanatory information may be in any suitable form, including text input by a user or created by performing voice recognition on speech information.

Regardless of the form of the help information, once created, users may be able to contribute the help information to the pool of community user experiences by uploading them to a location that is readily accessible to the rest of the online community. That location may be on a server accessible over a network. Any server of suitable type may be used. For example, a server responding to HTML commands may receive, store and provide help information. Though, in some embodiments, the server may be configured to provide one or more services relating to receiving and providing help information.

To facilitate users finding relevant help information, the help information uploaded by users may be cataloged on the server. The catalog may be based on an index created using input from users, either those who upload it or those who view and comment on it after it is uploaded. It is not a requirement that users perform all indexing, because such indexing may be performed by an administrator of the server or other entity. Alternatively or additionally, the index may be based on context information relating to the application automatically recorded as the help information is being recorded. Index terms may be extracted from or generated based on this context information transmitted to the server along with the help information.

Such a system may be implemented in any suitable way. For example, FIG. 1 depicts an overview of operation of the online help community made up of multiple users 110a, 110b, and 110c creating, uploading, and downloading help information associated with particular software application programs. In the example of FIG. 1, each of the users 110a . . . 110c is interacting with a computer 112a . . . 112c, respectively, that is configured to execute one or more application programs about which a user may desire to generate or access help information. In some embodiments, the help information may include video content depicting what a user sees displayed by a computer 112a . . . 112c as the users perform an application function.

Help information may be packaged in any suitable format. For example, video content may be stored in an artifact that may be manipulated by a computer such as a file. The file may contain information in addition to the video content.

In some embodiments, users may provide explanatory information synchronized to their actions depicted in the video content. The explanatory information may be provided in the same file as the video content or in any other suitable form. For example, a user recording help information may input explanatory information as text typed through a keyboard or other input devices associated with one of the computers 112a, 112b, and 112c. Alternatively, the explanatory information may be in an audio format. Users may record an audio portion of an audio-video screen cast video as depicted by one user 10a providing explanatory information through a speech input device 114a. In other embodiments, an audio portion of an audio-video screen cast video may be recorded separate from the video portion.

It is to be understood that even though a user may record audio or video portions of audio-video screen casts separately or simultaneously, in various embodiments, portions of audio streams may be pieced together with portions of video streams in whatever suitable manner to produce an audio-video screen cast video.

In addition to recording audio and/or video portions of screen cast videos, metadata information that might be relevant to the recorded video may be inputted or provided for each particular video. This information may be provided in the same file as other help information or linked to other help information in any other suitable way. Herein, metadata may be data in any suitable format about help information.

The metadata, for example, may identify a source of the audio-video information, such as the user who created the help information. Additionally, the metadata may indicate a particular application to which the help information relates. Moreover, applications may perform multiple application functions. If the help information relates to one or more specific application functions, the metadata may indicate those functions. Such indications may be made directly, such as by specifying the name of an application or an application function. Alternatively, the designations may be made indirectly, such as by capturing context data about an executing application at the time the help information was captured. Such context data may allow for automated processing of the metadata to infer the nature of the help information provided. Such information may be used for cataloging or otherwise indexing available help information.

Users may input any metadata describing features of a particular audio-video file that has been created. Client or server computers recognizing a particular video file format may also automatically generate specific metadata corresponding to the video file that may aid in identification of the particular video for use or viewing in the future. Examples of metadata include, but are not limited to, text descriptions, property values or headings, titles, file names, or any other suitable descriptive information.

In the embodiment illustrated, each of the users 110a . . . 110c is connected over a network 120 to one or more servers, such as servers 150 and 160, that may provide a mechanism for exchanging help information. In some embodiments, network 120 may be a corporate intranet allowing multiple users within a corporation or other entity to exchange help information. Alternatively, in some embodiments, network 120 may be the Internet, allowing users from any place in the world to exchange help information. Accordingly, it should be recognized that FIG. 1 is a greatly simplified illustration of a system according to embodiments of the invention. Though three users 110a . . . 110c are shown for simplicity, an on-line community may contain any number of users. Likewise, the embodiment of FIG. 1 illustrates two servers, server 150 and 160. In an embodiment in which users are distributed over a wide area, any number of servers may be used to provide a suitable location for help information. Moreover, to speed access in uploading and downloading video information, servers holding the help information may be distributed geographically and the help information may be replicated at multiple geographic locations. Accordingly, it should be appreciated that embodiments of the invention are not limited to the specific example configuration of FIG. 1. Servers 150 and 160 are representative of servers that provide a variety of functions, including categorizing and making accessible help videos for users 110a . . . 110c in the online community.

In this example, server 150 represents one or more devices that receives help information from users and appropriately catalogs information so that other users may more readily identify and obtain help information that is relevant to them. For example, server 150 may be programmed to associate with help information index information identifying the application or application function to which that help information relates.

As one example, a tagging method may be implemented for generating and/or storing tags that help to categorize videos for identification and searching purposes. In some embodiments, tags are generated based on any relevant metadata that may be useful for appropriately categorizing video files. In other embodiments, tags are generated based on the type of application for which help information appears in the video file. In further embodiments, tags may be generated based on speech recognition of the audio portion of the video files, alerting the system as to what type of identification the video file should be labeled with for proper categorization. As another example, image processing of video information may likewise be used to generate tags.

In the embodiment illustrated in FIG. 1, tags are generated in server 150. However, the location and hardware used to generate tags is not a limitation on the invention. Tags may be generated on client devices 112a . . . 112c, where any suitable classification method may be used before uploading to the server to tag the video file appropriately. In embodiments in which classification occurs on the client side, tags may be in the form of a description, automatically generated information, or any other suitable property. In an analogous fashion, tags may also be generated on the server side where any suitable classification method may be used after the video file has already been uploaded from the client to the server. In this respect, a tagging server computer 150 may be suitably used with the necessary software components to recognize uploaded video files, and generate tags efficiently and accurately for help video files. It should be understood that tag generation could occur on the client side or the server side, or both, as a way to generate index information.

Regardless of where or how the index information is generated, the index information may directly identify the application or application function by name. The name may be a formal name for the application or application function defined by the software provider for that application. Though, help information may alternatively or additionally be indexed by an informal name by which one or more users may identify the application or function. Further, index information may include one or more terms that a user is likely to include in a query seeking help about an application or application function. Regardless of the nature and amount of index information generated for each video clip or other unit of help information, server 150 may derive the index information from the help information or metadata provided with the help information.

Once server 150 generates index information for help information supplied by a user, server 160 may store the help information and related index information. For example, storage server 160 may be employed for storing video files as well as provide search capabilities. In some embodiments, a storage server 160 could be made up of an array of computers. In other embodiments, a storage server 160 could implement search features that are based on the tags that have been generated for each video file.

In the simple example of FIG. 1, databases 162 and 164 are shown associated with server 160. Database 162 may store help information provided by users. Database 164 may store the index information. With this configuration, server 160 may receive queries from users, such as users 110a . . . 110c. In response to each query, server 160 may search index information stored in database 164 to identify help information available, by matching a query provided by a user. Upon identification of relevant help information, server 160 may provide the help information from database 162. The help information may be provided to a user in any suitable form. For example, a copy of the help information may be provided directly to the user in response to a query. However, the information may alternatively be provided indirectly such as by providing a link identifying help information within database 162 matching a user supplied query. In such an embodiment, in response to a user query, server 160 may provide "thumbnail" data about available help information. For example, when help information is stored in a video format, thumbnail data may include a single image representative of an available video image. Alternatively or additionally, thumbnail data may include a textural description or other representation of the help information. In an embodiment in which server 160 initially returns thumbnail data in response to a user query, computer devices 112a . . . 112c may be configured to display the thumbnail information to users and allow users to select help information based on the thumbnail data. In response to such a request communicated over network 120, server 160 may then provide a copy of the help information from database 162.

However, the specific format in which help information is stored, indexed, searched and provided to users is not critical to the invention and any suitable format may be used. As one example, formats used in conjunction with known services, such as YouTube and Soapbox, may be used. However, the invention is not limited in this respect.

In addition, a system for providing community-based software application help may include components or functions not expressly shown or described. For example, in some embodiments, an authentication system is provided for users 110a . . . 110c to gain access to the community help service. In this regard, any suitable authentication system may be implemented such as, but not limited to, password protection systems, encryption protection, or certificate recognition of specific computers. Authentication may be used to preclude unauthorized parties or malicious parties from uploading help information into the system.

Figure 2:
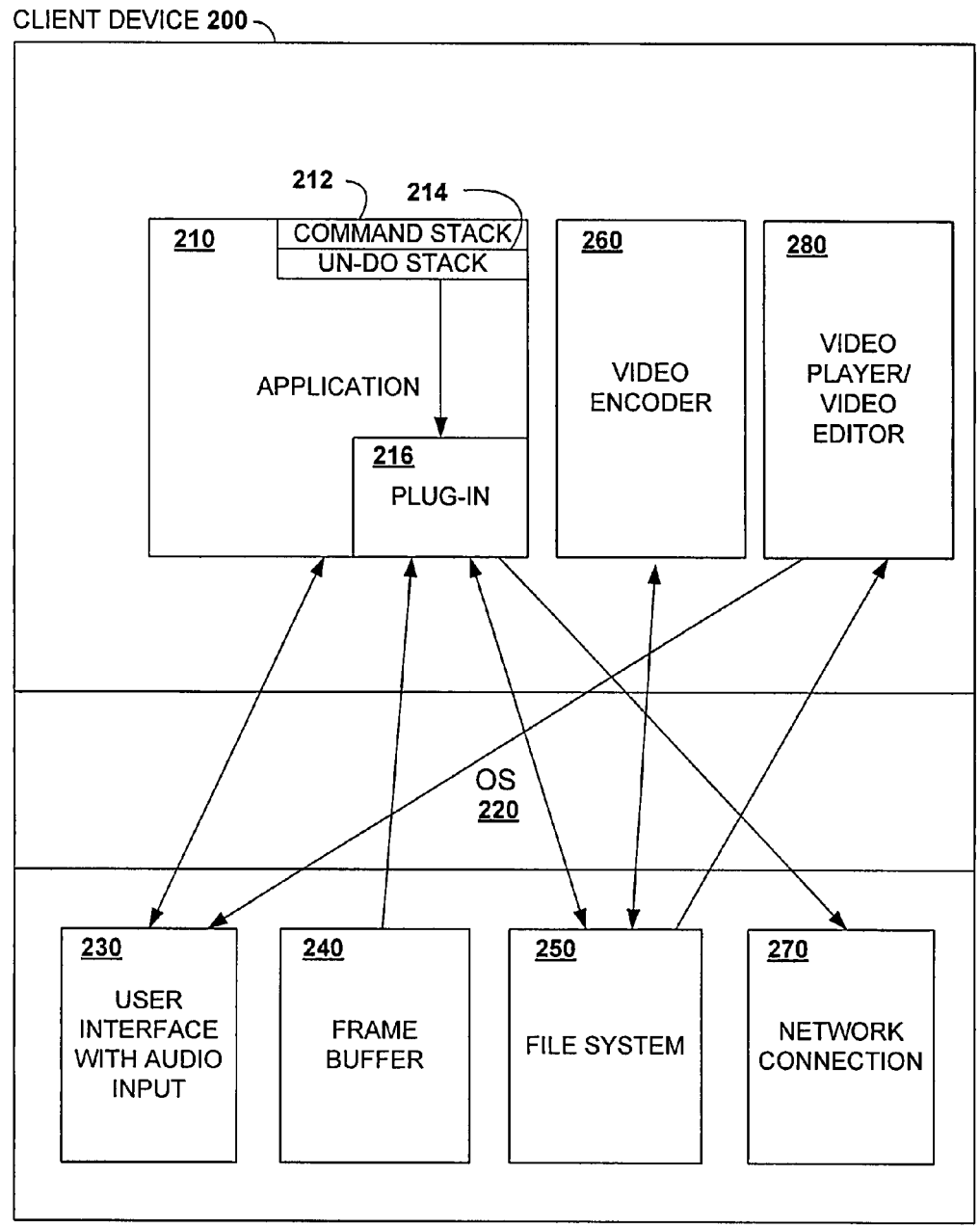
FIG. 2 is a sketch illustrating an architecture of a client-side computer in an operating system environment for creating audio-video screen casts and connecting to a network according to embodiments of the invention.

The help information made available through the help system illustrated in FIG. 1 may be obtained from any suitable source. However, in the embodiments described herein, help information is generated by users of an application about which help information is to be provided. Accordingly, in some embodiments of the invention, client devices executing applications may be configured to facilitate either the generation of help information or the use of help information available through a community-based help system according to embodiments of the invention. FIG. 2 illustrates an example architecture of client device 200 through which a user may access an application 210 for which help information is provided. Client 200 may be any suitable user computing device and may represent any of the client devices 112a . . . 112c (FIG. 1). As shown, application 210 runs on the client computer 200. Application 210 may be any suitable application including, but are not limited to, WORD®, EXCEL®, POWERPOINT®, PUBLISHER®, ACCESS®, or any other suitable OFFICE® add-in. Indeed, any type of program or software may be used as the application 210 from which screen cast videos are created.

Regardless of the specific functions performed by application 210, as a user interacts with application 210, the context of the application may change. Application 210 may maintain multiple types of information defining the context. In the example embodiment of FIG. 2, context information is illustrated by command stack 212 and undo stack 214. As different command functions occur during operation of the application 210, a command history is recorded in command stack 212 in memory of the computer while the application 210 runs. Undo stack 214, which records text and other non-command inputs into memory, is also incorporated within the application 210. However, other types of context information may be maintained within application 210.

Application 210 is configured to interact with a community-based software help system according to embodiments of the invention. In FIG. 2, plug in 216 is added to application 210 to provide tools, allowing a user interacting with application 210 on client device 200 to easily generate or access help information through a community-based software help system. In the embodiment illustrated, plug-in 216 is a help-related component that provides a simple mechanism for making tools available to a user of application 210.

In embodiments in which application 210 is designed to receive plug-in components, plug-in 216 may readily incorporated as a plug-in using known techniques. However, it is not necessary that tools enabling a user to easily generate and access help information be implemented as a plug-in, as any suitable architecture may be used.

In the example of FIG. 2, application 210 including plug-in 216, and other software components execute in operating system environment 220 and rely on components within the operating system environment 220 to access functionality that is available on client device 200. In some embodiments, the operating system environment may be a WINDOWS® environment. However, any type of operating system may also be used as the system environment 220 through which relevant applications and plug-ins run.

In the embodiment illustrated, operating system environment 220 allows application component 210, plug-in 216, and other application level components executing in operation system environment 220 to access a range of functionality. In the example illustrated, the operating system environment 220 provides support for user interface 230. User interface 230 may allow information to be presented to a user through a display screen or in any other suitable format. Likewise, user interface component 230 may allow an application level component to receive user input provided through a keyboard, a mouse or other input device. In the example illustrated, user interface component 230 may also receive audio input, such as speech input. In embodiments in which speech input is provided by a user of client device 200, user interface component 230 may be adapted to perform speech recognition to translate spoken information into text. However, the specific mechanisms through which a user such as users 110a . . . 110c (FIG. 1) interacts with an executing level component is not critical to the invention, and user interface component 230 may support interactions through any number and type of interfaces.

Client device 200 may also include a frame buffer 240 used in presenting information graphically on a display, such as a TFT display, connected to the client device 200. Components within the operating system environment 220 may load frame buffer 240 with numerous pixels of information, each pixel describing the visual characteristics of a single location on the display. Thus, the information in frame buffer 240 at any instant of time describes the information that could be viewed by a user of client device 200. In response to commands from application level components, components within the operating system environment 220 may alter the information in frame buffer 240 to alter the information displayed to a user. Application 210, plug-in 216, and other application level components within client device 200 may generate information for display through operating system components that alter the content of information in frame buffer 240, as is known in the art. Additionally, components within the operating system environment 220 may allow plug-in 216 to access the contents of frame buffer 240. By accessing the contents of frame buffer 240, plug-in 216 may access information defining what a user interacting with application 210 is viewing on a display associated with client device 200.

The operating system environment may also support a file system 250 as is known in the art. Herein, any suitable file system may be used. A file system allows for storage of data that may or may not be used for generation of a help. In some embodiments, a file system 250 may be used to store video related files and/or audio related files. However, file system 250 may be a general purpose file system and may store files containing information of any suitable type.

Client device 200 may also include a network connection 270, providing a mechanism for online connection to a larger community of users to exist. Network connection 270 may be a network connection as is known in the art. Though, any suitable network connection may be used. In some embodiments, videos that have been created for help purposes with an application 210 from the client side 200 may be uploaded through a network connection 270 for access by a community of users. In other embodiments, videos that have been created for help purposes with an application 210 that are located online may be downloaded through a network connection 270 for access by a client 200. In further embodiments, an appropriate user authentication protocol may be implemented for uploading and/or downloading videos to and from the network community. In this manner, a help community for any suitable application may be widely developed through a network connection 270. In different embodiments, a help community for any suitable application primarily using multimedia screen cast videos may be largely used and developed through a network connection 270.

In addition to components accessed through the operating system environment 220, client device 200 may include one or more application level components that are accessed to generate or display community-based help information. In the embodiment of FIG. 2, video encoder 260 and video player/editor 280 are shown.

Video encoder 260 may be a video encoder as is known in the art. Though, any suitable video encoder may be used. A video encoder 260 changes signals such as streams of bits or data to be changed into another useable form of data or code.

In the embodiment illustrated, streams of data representing data from frame buffer 240 captured at successive instances in time may be provided to video encoder 260 for conversion into a video file format or other suitable representation of a video clip or the video portion of an audio-video clip. Any suitable capture time resolution may be used by the video encoder 260 to form video data that may be used for a screen cast video.

In the embodiment illustrated, video encoder 260 is shown as a separate application level component from plug in 216 that performs functions associated with generating and using community-based help information. In other embodiments, a video encoder 260 may be incorporated into a plug-in 216 component such that streaming audio and/or streaming video may be directly converted into a more useable multimedia file format that is readily edited or stored for future use.

In one embodiment, the video encoder 260 may be WINDOWS® Media Encoder, which allows for capturing and encoding screen casts to occur into a WMV file format, including WMA audio. Other examples of file formats that a video encoder 260 may encode into include, but are not limited to, AVI, MPG, MPEG, MPEG-2, MOV, AIFF, XMF, IFF, ASF, DVR-MS, MP4, OGG, OGM, RealMedia, MKV, 3GP, DIVX, or any other suitable file format.

Though the specific video encoder used and the format for video information used is not critical to the invention, it may be desirable for the settings of the video encoder to generate video clips with a resolution sufficient to allow a user, when viewing those video clips, to observe the details of what is displayed on a computer display as depicted in the video clip. On the other hand, increasing the resolution can increase the amount of memory required to store and process video clips, which can impose undesirable limitations on the community-based help system. In some embodiments, display components within operating system environment 220 set the display resolution to approximately 1024×768 pixels, which also defines the resolution of the data captured from frame buffer 240 and the resolution of data input to video encoder 260. Settings of the video encoder may also impact the resolution and size of the resulting video clips. As an example, in embodiments in which the video encoder is the WINDOWS® Media Encoder, the following Profile (prx file) setting may be used:

Audio
Mode—Quality VBR
Codec—WMA 9.1 Professional
Format—VBR Quality 98, 44 kHz, 2 channel 24 bit VBR
Video
Mode—Quality VBR
Codec—WMV 9
Video size—Same as video input
Frame rate—10 fps
Key frame interval—10 sec
Video quality—100 (scale of 0 to 100)
Decoder complexity—Auto
Target bit rates
Quality-based
Video format
Custom
Total—Quality-based
Video bit rate—Quality-based
Audio bit rate—Quality-based
Overhead—Quality-based Client device 200 may also be equipped to allow a user to view and edit a video file in any suitable fashion before uploading to a general community, or that are downloaded by a user to access help information generated by others in that community. Accordingly, client device 200 is shown to include a video player/video editor 280. In this respect, any suitable video player and video editor software components as are known in the art may be used. Regarding viewing the video file, any appropriate video playback program may be used. In one embodiment, WINDOWS® Media Player may be used to view a suitably rendered video. Regarding editing the video file, any appropriate video editor program may be used. In one embodiment, WINDOWS® MovieMaker may be used for post-capture editing.

Figure 3:
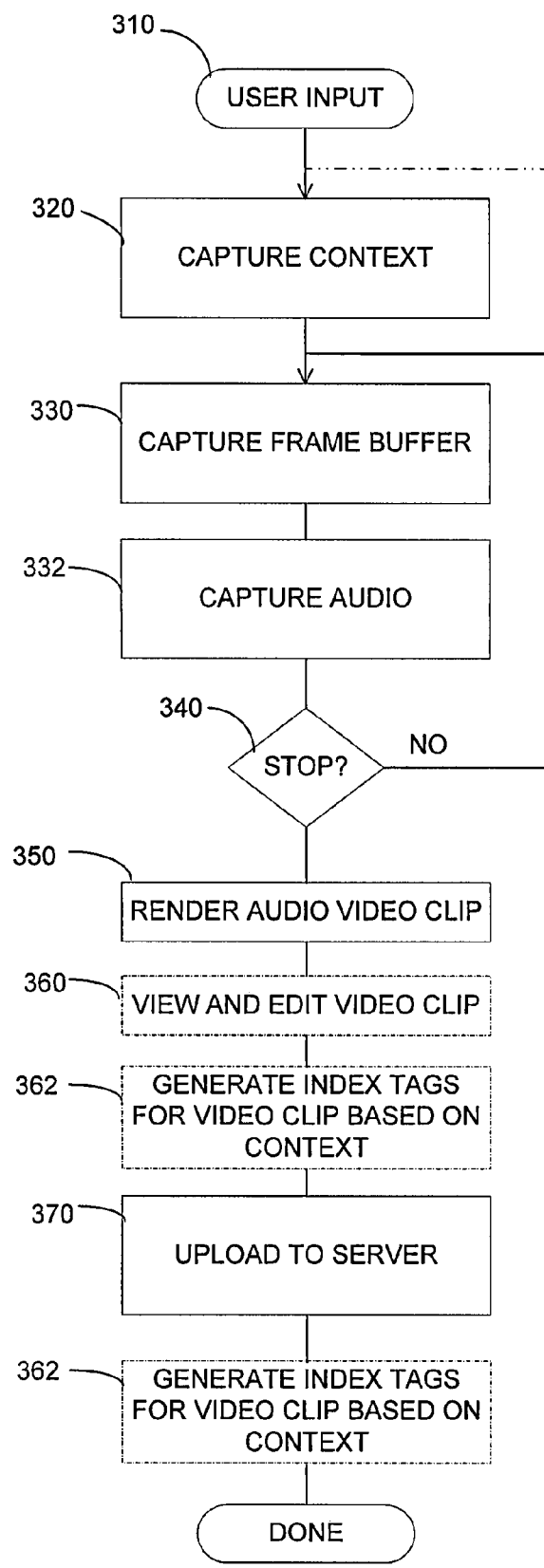
FIG. 3 is a flowchart of a process in which a user creates an audio-video screen cast for a help community according to embodiments of the invention.

Turning to FIG. 3, a flow chart of a process by which client device 200 may operate to generate help information in shown. The process of FIG. 3 begins with user input at block 310. In the embodiment illustrated, plug-in 216 generates one or more control objects that appear on a user interface associated with the user interface provided by application 210. One of these control objects, when selected by a user, may trigger the process of creating a help video clip illustrated in FIG. 3. In a client device 200 as illustrated in FIG. 2, the user input received may be provided through user interface component 230. However, any suitable mechanism may be used to receive user input in triggering a process of generating help information.

Regardless of how the process is initiated, the process proceeds to block 320. At block 320, plug-in 216 captures context information relating to application 210. In the embodiment illustrated in FIG. 2, context information may include information obtained from command stack 212 and undo stack 214. Information in command stack 212 may indicate the most recent commands processed by application 210. This information may indicate the application functions being performed by the user for which help information is being captured. Similarly, undo stack 214 contains information indicating text or other information recently input by a user. Information in undo stack 214 may also provide context for the function about which a user is capturing help information. Though FIG. 2 illustrates two types of context information, application 210 may maintain different or additional types of context information. For example, application 210 may maintain focus information, which may provide useful information about the context of application 210. To illustrate focus information, for example, a complex application may support multiple windows, control objects such as drop down boxes, buttons, and provide multiple objects. At any given time during the execution of application 210, some or all of these objects may be active, but some may be inactive and unavailable as choices for a user to select. For example, it is known for applications to display control objects with a grayed out appearance when inactive or unavailable. Information defining which windows and objects are active may generally define the focus of the application. Such information, in some embodiments, may be captured at block 320.

The process then proceeds to block 330 where video information is captured. At block 330, plug-in 216 may copy information from frame buffer 240. The information copied from frame buffer 240 represents a display as viewed as a user of client device 200. In the embodiment of FIG. 2, plug-in 216 may retrieve this information from frame buffer 240 and store it in the appropriate location within file system 250 or in any other suitable way.

At block 332, audio information may be captured. In the embodiment illustrated in FIG. 2, a user interfacing with client device 200 generating help information may provide a narrative in spoken form describing the user interactions with application 210 or other information appearing on the display of client device 200 as depicted in the information captured at block 330. The specific format in which audio information is captured at block 332 is not critical to the invention. However, user interface 230 may covert audio information to digital form, which plug-in 216 may receive and store in a file within file system 250.

The process then proceeds to decision block 340. At decision block 340, the process may branch depending on whether additional user input indicating that the process of capturing user interactions with application 210 is completed. In the embodiment illustrated in FIG. 2, plug-in 216 may generate a control which is displayed is through a user interface of client device 200. The control, when selected by a user, may cause the process of FIG. 3 to stop collecting audio data at block 332 and video data at block 330. If the stop input is not received, the process may loop back to block 330 where the contents of the frame buffer are again captured, creating a further frame in a sequence of frames depicting user interactions with application 210. When the process loops back, further audio information may likewise be captured at block 332.

FIG. 3 illustrates an alternative embodiment of the process in which processing loops back from decision block 340 to block 320. In this embodiment, block 320 is repeated, resulting in further context information being captured. In this way, for each frame of video data captured at block 330, context data captured at block 320 and audio data captured at block 332 may be available. The process may continue in this fashion capturing video information at block 330 in conjunction with audio information and/or context information until a stop input is received from a user. When the stop input is received, the process may branch to block 350.

Once the stop mechanism is activated, recording stops and the captured information may be converted at block 350 to an audio-video clip through any suitable fashion, such as through a video encoding software component. In the embodiment of FIG. 2, this processing may be performed within video encoder 260. Video encoder 260 may retrieve captured audio and video information stored within file system 250 and convert that information into a video clip or other suitable format.

In some embodiments, a user generating a help audio-video clip may optionally view and edit the clip at block 360. Processing at block 360 may be performed based on user interactions with video player/video editor 280 (FIG. 2). However, any suitable mechanism for viewing and editing video clips may be employed.

The process of FIG. 3 may also include a step of generating index tags for the video clip. As described above, tags may be generated by processing on server 150. However, processing at block 362a may optionally be performed by plug-in 216 or other software components on client device 200. As with the processing server 150 described above, processing at block 362a may be performed based on an analysis of context data captured at block 320 or other information available concerning the context of the application at the time the video clip was captured. The process then proceeds to block 370. At block 370 help information is uploaded to a server where it is made available to other users within the help community. In the embodiment of FIG. 1, upload to a server may entail interactions between a client device, such as client device 112a ... 112c, through a network 120, and a server 150 or a server 160.

As a result of these interactions, the audio/video clip rendered at block 350 may be uploaded and stored in a data base 162 where it may be accessed by other users in the community. Processing at block 370 may also include uploading metadata associated with the audio-video clip. In embodiments in which processing at block 362a is performed to generate index tags, the generated index tags may form a portion of the metadata associated with the video clip. Alternatively or additionally, other forms of metadata may be uploaded at block 370, including context information captured from the application or provided by user input or other suitable source. Regardless of what metadata is supplied, the server receiving that metadata at block 370 may generate index information stored in database 164 (FIG. 1), allowing the audio-video clip to be indexed such that it may be retrieved in response to a query from a user.

After the clip is rendered, the clip would typically be viewed by the user through a media player wherein the video may be assessed as to whether it is suitable for uploading. If the clip is not suitable for uploading, the user may use any appropriate video editing software to process the video clip into a suitable screen cast video product. On the other hand, if preferred, the user may start over in producing a whole new set of streaming audio and video where frame and audio capture may be performed.

In addition to video editing as an option for post-capture video processing, index tags may also be generated specific to the content of the video clip. It should be understood that tag generation should not be limited to only the client side as it may also be performed on the server side. Indeed, it is possible for certain aspects of tag generation be performed on the client side and other aspects of tag generation to occur on the server side. For example, it may be easier for a user to create descriptive metadata about the video clip on the client side and for a server side program to create property metadata regarding the video clip or appropriate thumbnails for presentation and categorization. In this case, as described previously, tag generation may occur on both the client and server side. Once the video clip is fully rendered and ready for community access, video clips may be uploaded to the server side at block 370.

In various embodiments, indexing may be performed by processing in block 362b located after block 370 in the exemplary process flow illustrated in FIG. 3. In this regard, after uploading the video clip to the server, index tags may be generated on the server side based on various metadata or properties derived from the video clip. In some embodiments, tags may be produced based on the metadata associated with the video clip. In other embodiments, tags may be produced based on the audio and/or video content of the clip. A tagging server 150 (FIG. 1) may be used to generate index tag information for each video clip, the index tags forming a portion of the metadata associated with the video clip and/or being stored alongside the corresponding video clip. It should be understood that block 362b may located after block 370 either in place or in addition to the block 362a that is located before block 370.

Regarding server side aspects of the present invention, videos may be stored, categorized, and accessed using any appropriate hosting service, including a video nesting service as known in the art. In some embodiments, Soapbox video hosting service may be used for effective implementation of video presentation, categorization, searching, viewing, and other desired server side aspects. Such a service provides functions ancillary to storing help videos and providing them to user on request. Such a service may provide appropriate user authentication protocols and user data storage. More specifically, users may first be asked to sign-in and be properly authenticated in order for upload to start. An optional feature when the upload begins or once uploading is completed could be that the user adds a title, description, or other relevant tag for the video. In other embodiments, the video may be assigned to a category as the description may be automatically pre-populated using data from the applications and other context or related metadata. In different embodiments on the server side, video files may be transcoded to Flash video for ease in viewing through a web browser. An example of this embodiment includes video transcoding from a WMV file format to Flash video using Rhozet Carbon Encoder software and On2 Flash video codecs. Once video files are suitably transcoded into an appropriate video format that may be embedded within a web browser portal, thumbnails may be created from the video and stored along with other metadata, both user-assigned or automatically generated, to be used for later display.

In various embodiments, delivery to other users may occur through any suitable means. In one particular example, when transcoding and other processing is completed, transcoded Flash video may be uploaded to content delivery network (CDN) edge servers for ready access to users worldwide. In such an embodiment, CDN nodes may be deployed in several locations, cooperating with one another in an optimization scheme to deliver internet content efficiently and effectively to end users. In other embodiments, users may have the ability to search for videos by browsing through a library of videos or by using keywords that are associated with the title, description, and other relevant tags. Once users have found a video with the desired content, the video may be downloaded for viewing. It should be understood that the server side has aspects that allow users to upload videos, contributing to the help video community as well as download videos, gaining help from the help video community. In various embodiments, there are regulatory personnel and/or software programs on the server side that inspect the library of videos for appropriateness as well as suitability for their stated purpose in providing help information for particular applications.

Figure 4:
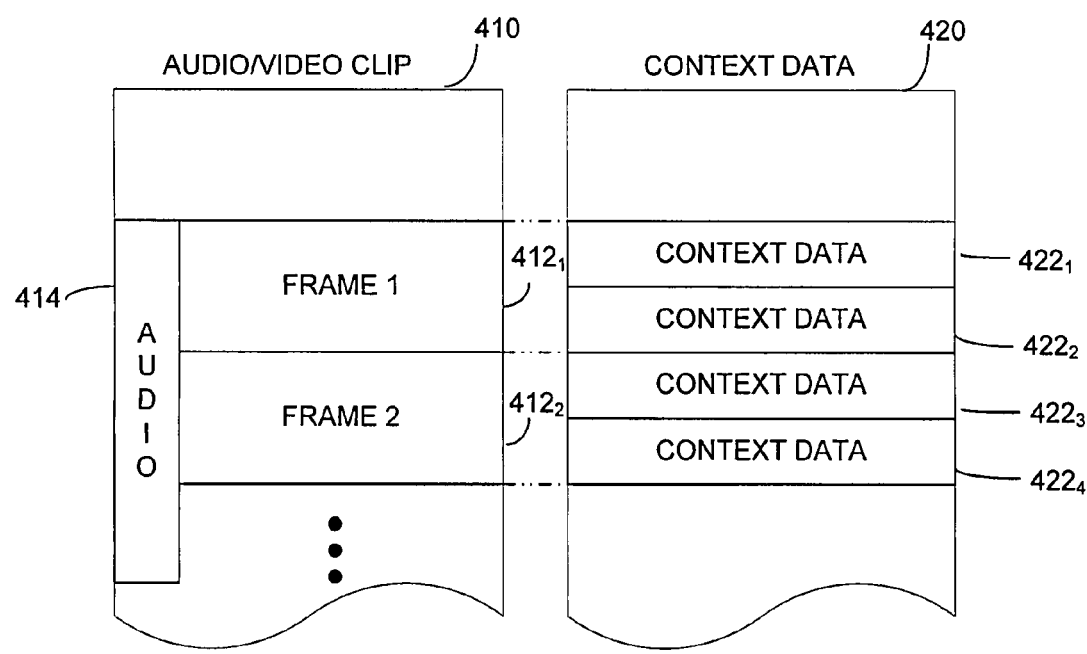
FIG. 4 is a schematic representation of data structures that comprise an audio-video screen cast according to embodiments of the invention.

Turning to FIG. 4, an example of the format of help information uploaded to a server is illustrated. The data structures illustrated in FIG. 4 may be stored in the file or other suitable computer readable media. As shown, an audio-video clip 410 may contain data defining a stream of audio 414 synchronized with one or more frames of data $412_1$, $412_2$ . . . , with each frame of data constituting video data that defines the appearance of the display of a computer executing an application at an instant of time. The sequence of frames $412_1$, $412_2$ . . . illustrated in FIG. 4 as forming an audio-video clip 410 may represent the screen display of client device 200 over an interval of time. That interval of time may be selected by a user, through appropriate activation of start and stop commands at blocks 310 and 340 (FIG. 3). As shown, an audio-video clip 410 may contain a stream of audio 414, housing synchronized defined frames of video information. The series of frames $412_1$, $412_2$ . . . may be in the form of image files including, but are not limited to, JPEG, MPG, MPEG, MPEG2, BMP, TIF, TIFF, GIF, PGF, RAW, PNG, HDP, XPM, MrSID, SVG, or any other suitable image file format. The audio may overlay along with the sequence of screen shots. Audio stream 414 may be incorporated in the same file as the video information or in a different file in a file format such as, MP3, AVI, MP4, WAV, MPEG-4, AIFF, AAC, or any other suitable audio file format. Though not explicitly shown in FIG. 4, it is to be understood that the audio segment 414 may also be split into different portions, ultimately put together into one continuous stream. In this respect, it is possible for audio fragments to be pieced together using any suitable audio and/or video editor to form the audio stream 414.

Regardless of the specific format in which audio and video information is stored, the information may be stored in connection with context data 420. Context data may be stored in the same file as audio, video or audio-video information. Alternatively, context data 420 may be stored in a separate file. Regardless of the specific manner in which context data 420 is stored, the context data may be correlated with audio or video information captured at a specific time. For example, context data items $422_1$ and $422_2$ are shown associated with frame $412_1$. Similarly, context data items $422_3$ and $422_4$ are shown correlated with frame $412_2$. Context data items $422_1$, $422_2$ . . . are also stored with an association to portions of audio stream 414. In the embodiment illustrated, the association is based on the context of application 210 at the time each of the frames and each portion of the audio data was captured.

FIG. 4 is a schematic representation of a data structure holding both audio, video and context data. Correlation is shown through position of the specific data items. However, any suitable mechanism, including tags, labels or other identifiers may be used to preserve a relationship between the audio, video and context data as the invention is not limited to the specific representation shown in FIG. 4.

Figure 5:
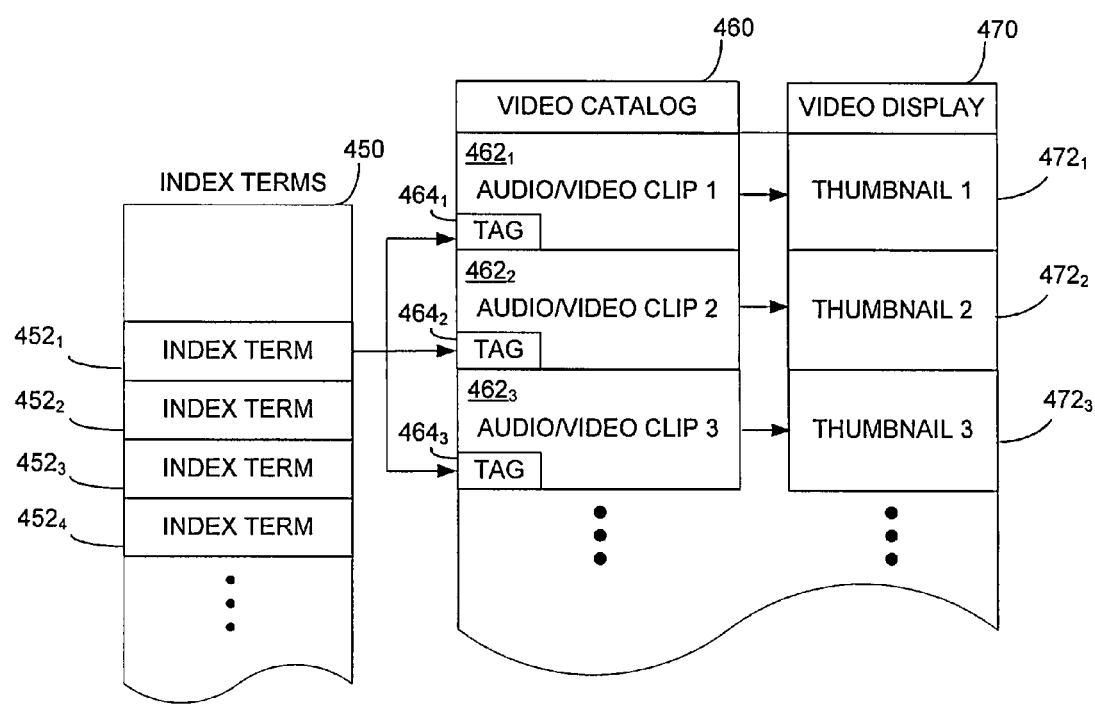
FIG. 5 is a schematic representation of data structures that may be used to store audio-video screen casts according to embodiments of the invention.

FIG. 5 is a schematic representation of an example for how tagged video clips 410 may be searched and displayed. Index terms 450, 452 are stored on an online server that allows for searching of audio/video clips 410 to be performed based on search terms that correspond to tags 464 that are generated, the tags corresponding to each audio/video clip 410.

In this way, index terms may be generated from tags associated with video clips as they are added to a database of video clips that may be made available to multiple users of a on-line community sharing help information. In this respect, index terms 452 that may be grouped together may be triggered by any suitable searching mechanism. Each index term 452 may point to a set of tagged audio/video clips 410 that have been cataloged and are ready for retrieval upon activation of the index term 452. A video catalog 460 organizes and stores the audio/video clips 410 according to relevant tag information 464 such that once a particular index term is triggered, appropriate audio/video clips may be retrieved according to their tag information.

As shown in FIG. 5, in one example, a mechanism for display 470 of the retrieved videos allows for images to be viewed in the form of thumbnails 472 so that users may be able to select which video to download or view. It should be understood that any suitable index tagging mechanism may be used to appropriately categorize video clips and allow for searchability. For example, index terms and tags may be based on context information captured automatically from an application when a video clip was created or other metadata associated with the video clip on a client device used to capture the video clip, text descriptions, audio content, video content, and/or a combination thereof. Text descriptions may be produced by the user, comments made by other users, automatically generated by the client and/or server, or any other suitable method. Although video clips are categorized and stored in an organized fashion, index terms may be triggered in any suitable manner, or not at all. In some embodiments, video clips may be retrieved through a text search of particular index terms. In other embodiments, video clips may be retrieved simply by way of a user browsing through a catalog of index terms under which tagged video clips are stored.

Figure 6:
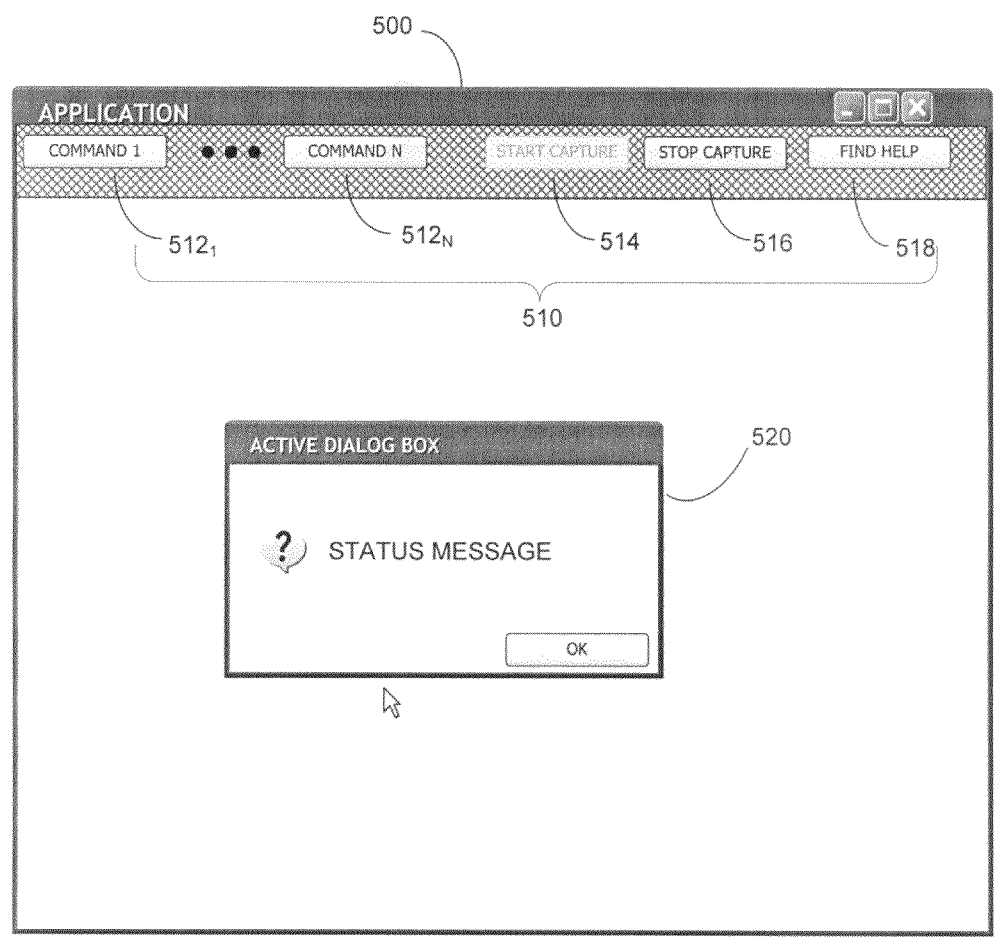
FIG. 6 is a sketch of a user interface of an application from which a help audio-video screen cast may be created according to embodiments of the invention.

FIG. 6 illustrates the nature of video information that may be captured in an audio-video clip 410 created to provide help information to other users. User interface 500 represents a user interface that may be presented to a user while interacting with application 210.

User interface 500 includes a control display area 510. Control display area 510 includes controls $512_1 \ldots 512_N$ that a user may select to cause application 210 to perform an application function. The specific functions associated with each of the controls $512_1 \ldots 512_N$ may depend on the nature of application 210. For example, if application 210 is a word processing application, controls $512_1 \ldots 512_N$ may perform functions relating to accessing documents containing text, formatting text of other application functions associated with word process.

In the embodiment illustrated, control display area 510 is depicted as a "ribbon" across one edge of user interface 500. Presenting controls in a ribbon in this fashion provides a consistent mechanism for a user to identify available command options.

In the embodiment illustrated, application 210 may be extended through the use of a plug-in 216 (FIG. 2). The application 210 may present controls specified by plug-in 216 in the control display area 510 in a fashion consistent with that used to display controls generated by application 210 itself. In this way, a user is provided with a simple mechanism for accessing controls associated with tools provided by plug-in 216 for creating or accessing help information through a community-based help system. In the embodiment illustrated in FIG. 6, the plug-in 216, defining the client component of the community-based help system, presents three additional controls in control display area 510. As illustrated, controls 514, 516 and 518 are generated by plug-in 216 (FIG. 2) to perform help related functions. In the example illustrated, control 514, when selected by a user, starts the capture of information that may ultimately be rendered into an audio-video clip. Selection of control 514, for example, may initiate processing at block 310 (FIG. 3). In this respect, once control 514 is selected to begin capture, the display for control 514 is grayed out to signify that capture is already in process.

Control 516, when selected by a user, may stop the capture of information that may be converted to an audio-video clip. Selection of control 516, for example, may cause the processing depicted in FIG. 3 to branch from decision block 340 to block 350. Control 518, when selected by a user, may start a process by which a user may search for help information available through a community-based help system.

FIG. 6 provides an example of a user interface that may appear all at once while a user interacts with application 210. In this example, the user has performed a function causing dialog box 520 to appear. In this case, dialog box 520 provides status information concerning the operation of application 210. If the content of frame buffer 240 (FIG. 2) is captured with a display in this state, the captured frame buffer data will reveal that the dialog box 520 is on the screen and they also reveal the status message presented through dialog box 520. As the user continues to interact with application 210 and the graphical user interface 500, the information displayed in graphical user interface 500 may change. Accordingly, as further frames are captured from the frame buffer 240, the content of the display may change. As a result, a sequence of frames captured may reveal the pattern of interactions between a user and application 210.

FIG. 6 also illustrates a type of context information that may be available and captured in conjunction with the video information depicting graphical user interface 500. Specifically, FIG. 6 illustrates "focus" of a user interface. For example, control 514 is shown grayed. In contrast, control 516 is shown to be active. As mentioned previously, this representation indicates that control 514 cannot, at the time depicted in FIG. 6, be selected by a user. In contrast, control 516 is active and can be selected by a user. This configuration represents an operating scenario in which video capture has already been initiated by a prior selection of control 514. In this context, it is not meaningful for a user to select control 514 because capture has already been initiated. However, it is meaningful for the user to select control 516 to stop that data capture.

Focus is also illustrated by dialog box 520. In this example, dialog box 520 is an active dialog box. Accordingly, the focus of application 210 may be dialog box 520. Capturing such focus information concerning application 210 may provide an alternative mechanism for obtaining context about the screen displays captured to generate a help video according to embodiments of the invention.

Figure 7:
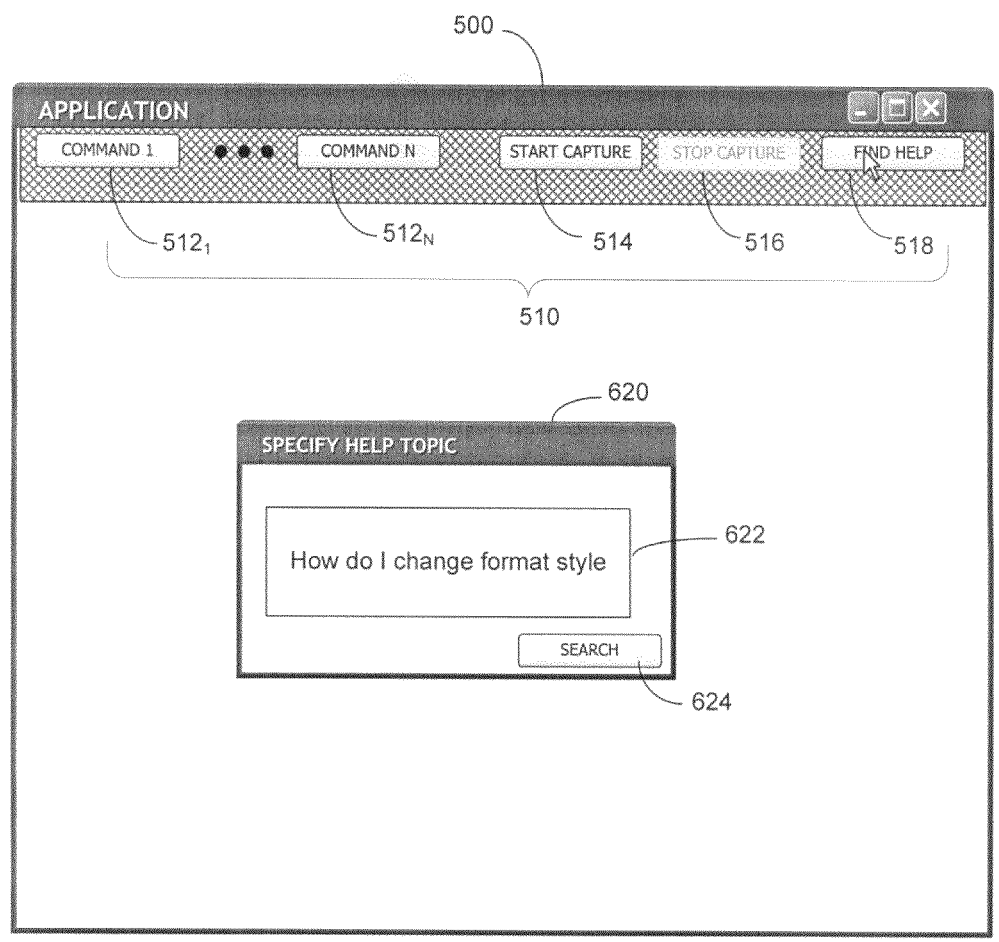
FIG. 7 is a sketch of a user interface of an application from which a user may search for a help audio-video screen cast according to embodiments of the invention.

FIG. 7 shows a graphical user interface 500 in an alternative operating state. In the operating state indicated in FIG. 7, control 516 is shown grayed out but control 514 is shown active. Such a display may correspond to an operating state in which the user is not actively capturing help information.

In the operating state illustrated in FIG. 7, a user has selected control 518. In the embodiment illustrated, control 518 is provided by a help related component, such as plug-in 216. When selected, control 518 initiates a process through which a user may obtain help information from a community-based help system. As shown, selecting control 518 opens a dialog box 620 through which a user may input a description of a help topic about which the user wishes to receive information.

As shown in FIG. 7, dialog box 620 contains an input field 622 through which a user may input a description of a help topic in a text format. The help topic may be described in a form of a question as indicated in FIG. 7. The tool receiving the text input through input field 622 may convert that question to a query with search terms that are sent to a server, such a server 160, that may identify previously stored help information that responds to the user input. Applications that receive descriptions of help topics in the form of questions are known and maybe used to implement the tool that presents dialog box 620 to a user. However, the specific form in which a user specifies a help topic is not critical to the invention and any suitable mechanism may be used, for example, a simple string of text that may be effectively converted into a query.

Figure 8:
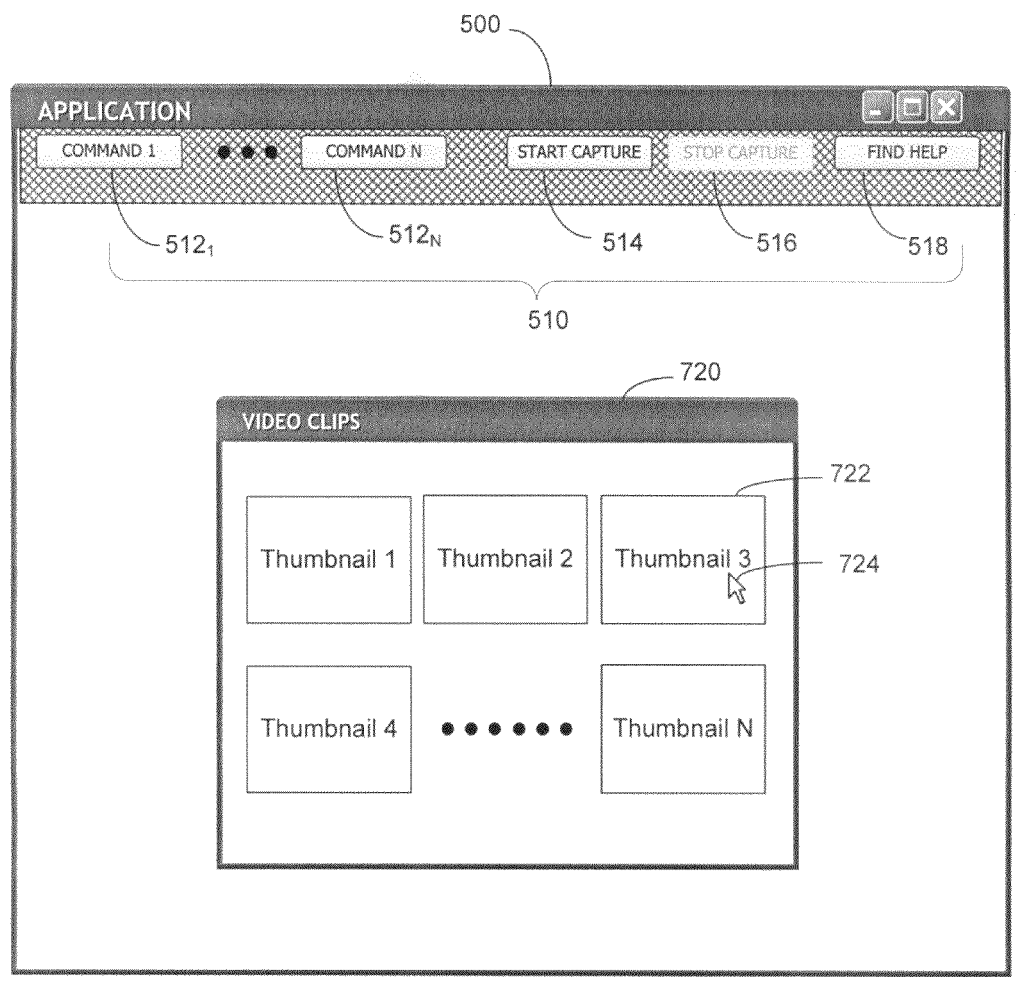
FIG. 8 is a sketch of a user interface of an application from which a user may choose audio-video screen casts represented by thumbnails according to embodiments of the invention.

Regardless of the form in which the help topic is specified, once specified, users may select control 624 which triggers the tool providing dialog box 620 to convert the input received through field 622 into a query appropriate for the community-based help system in use. In return, the tool may receive a specification of one or more audio-video clips that provide help information concerning the topic described in the search query. The tool receiving the specifications may present the information, such as in the form of thumbnail information, as shown in FIG. 8. A user may then select one or more of the video clips for viewing to obtain help information. In the example shown in FIG. 8, a video display 720 allows for a user to view a selection of thumbnails 722 that incorporate screen shot images of the corresponding video clip. In the example illustrated, the thumbnails displayed may have been selected based on a search query input by a user. Such a search query for example, may be applied to an index of video clips as depicted in FIG. 5. However, the thumbnails displayed may be selected in any suitable way. Once the user browses through a suitable number of videos represented by thumbnails 722, the user may select any particular video with a selecting mechanism 724. Any suitable mechanism for selection may be used, for example, but not limited to, keystroke commands, mouse selection, video detector selection and/or audio command selection.

As an example of the operation of a community-based help system, a user may know a special trick to format the font size for OFFICE® POWERPOINT® slides, involving finding a ribbon button or command line feature. The user may be able to show other OFFICE® users how to perform this operation by recording a screen cast of finding and selecting the appropriate ribbon and button on the screen within the application, along with an audio narration. In this manner, it only takes a few minutes for the user to record and view the video clip to see if it is suitable to upload. If it is not suitable to upload, the user may either re-record the video screen cast or edit the video clip using any suitable video editing software. Once the video is uploaded, a video service categorizes the video, allowing other users to find the video when looking for help on the topic. To viewers looking for help, the video clips simulates a situation where the viewer is being directly shown by a friend or colleague how to solve their problem.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of providing help information in connection with an application program, the method comprising:
    displaying, by a computing device, a user interface of the application program for receiving user interactions, the user interface of the application program presenting a control display area having controls to perform application functions of the application program for processing a document associated with the application program;
    executing a plug-in for the application program, the plug-in presenting additional controls in the control display area, the additional controls including a control to create a video clip of help information related to one or more application functions of the application program and a control to search for available help information provided by an online community system hosted by a server;
    in response to selection of the control to create the video clip of help information, capturing video information depicting user interactions with the application program;
    automatically capturing context information maintained by the application program via the plug-in, the context information recorded by the application program during the user interactions with the application program, the context information including user input received by the application program and commands processed by the application program in response to selection of one or more of the controls to perform application functions of the application program;
    generating searchable tag information based on the context information for aiding identification of the video clip in a future search, the searchable tag information indicating the application program and at least one specific application function performed during the user interactions with the application program;
    in response to determining that the user interactions with the application program have completed, generating the video clip of help information based on the captured video information depicting the user interactions with the application program; and
    uploading the video clip of help information with the searchable tag information to the online community system for indexing the video clip of help information based on the application program and the at least one specific application function performed during the user interactions with the application program, wherein:
        the online community system is accessible to a plurality of users,
        the online community system is configured to provide access to the video clip of help information based on the searchable tag information, and
        selection of the control to search for available help information presents a dialog box for submitting a query to the online community system.

2. The method of claim 1, wherein the context information indicates a focus of the application program that was recorded when the at least one specific application function was performed during the user interactions with the application program.

3. The method of claim 1, wherein:
    the commands processed by the application program are recorded in a command stack of the application program, and
    automatically capturing context information comprises capturing information in the command stack.

4. The method of claim 1, wherein:
    the user input received by the application program is recorded in an un-do stack, and
    automatically capturing context information comprises capturing information in the un-do stack.

5. The method of claim 1, further comprising receiving an audio narration provided by a user during the user interactions with the application program.

6. The method of claim 5, further comprising:
    generating explanatory information based on the audio narration provided by the user; and
    uploading the explanatory information to the online community system.

7. The method of claim 1, wherein generating searchable tag information further comprises generating the searchable tag information based on image processing of the video information.

8. The method of claim 1, wherein generating searchable tag information further comprises generating the searchable tag information based on audio portions of the video information.

9. A computer-readable storage device storing computer-executable instructions that, when executed by a computing device, cause the computing device to perform a method of providing help information associated with an application program, the method comprising:
    displaying, by the computing device, a user interface of the application program for receiving user interactions, the user interface of the application program presenting a control display area having controls to perform application functions of the application program for processing a document associated with the application program;
    executing a plug-in for the application program, the plug-in presenting additional controls in the control display area, the additional controls including a control to create a video clip of help information related to one or more application functions of the application program and a control to search for available help information provided by an online community system hosted by a server;
    in response to selection of the control to create the video clip of help information, capturing video information depicting user interactions with the application program;
    automatically capturing context information maintained by the application program via the plug-in, the context information recorded by the application program during the user interactions with the application program, the context information including user input received by the application program and commands processed by the application program in response to selection of one or more of the controls to perform application functions of the application program;
    generating searchable tag information based on the context information for aiding identification of the video clip in a future search, the searchable tag information indicating the application program and at least one specific application function performed during the user interactions with the application program;

in response to determining that the user interactions with the application program have completed, generating the video clip of help information based on the captured video information depicting the user interactions with the application program; and uploading the video clip of help information with the searchable tag information to the online community system for indexing the video clip of help information based on the application program and the at least one specific application function performed during the user interactions with the application program, wherein:
the online community system is accessible to a plurality of users,
the online community system is configured to provide access to the video clip of help information based on the searchable tag information, and
selection of the control to search for available help information presents a dialog box for submitting a query to the online community system.

10. The computer-readable storage device of claim 9, wherein the context information indicates a focus of the application program that was recorded when the at least one specific application function was performed during the user interactions with the application program.

11. The computer-readable storage device of claim 9, wherein:
the commands processed by the application program are recorded in a command stack of the application program, and
automatically capturing context information comprises capturing information in the command stack.

12. The computer-readable storage device of claim 9, wherein:
the user input received by the application program is recorded in an un-do stack, and
automatically capturing context information comprises capturing information in the un-do stack.

13. The computer-readable storage device of claim 9, further storing computer-executable instructions for receiving an audio narration provided by a user during the user interactions with the application program.

14. The computer-readable storage device of claim 9, wherein generating searchable tag information further comprises generating the searchable tag information based on image processing of the video information.

15. The computer-readable storage device of claim 9, wherein generating searchable tag information further comprises generating the searchable tag information based on audio portions of the video information.

16. A computing device comprising:
a processor configured to execute computer-executable instructions; and
memory storing computer-executable instructions for:
displaying, by the computing device, a user interface of the application program for receiving user interactions, the user interface of the application program presenting a control display area having controls to perform application functions of the application program for processing a document associated with the application program;
executing a plug-in for the application program, the plug-in presenting additional controls in the control display area, the additional controls including a control to create a video clip of help information related to one or more application functions of the application program and a control to search for available help information provided by an online community system hosted by a server;
in response to selection of the control to create the video clip of help information, capturing video information depicting user interactions with the application program;
automatically capturing context information maintained by the application program via the plug-in, the context information recorded by the application program during the user interactions with the application program, the context information including user input received by the application program and commands processed by the application program in response to selection of one or more of the controls to perform application functions of the application program;
generating searchable tag information based on the context information for aiding identification of the video clip in a future search, the searchable tag information indicating the application program and at least one specific application function performed during the user interactions with the application program;
in response to determining that the user interactions with the application program have completed, generating the video clip of help information based on the captured video information depicting the user interactions with the application program; and
uploading the video clip of help information with the searchable tag information to the online community system for indexing the video clip of help information based on the application program and the at least one specific application function performed during the user interactions with the application program, wherein:
the online community system is accessible to a plurality of users,
the online community system is configured to provide access to the video clip of help information based on the searchable tag information, and
selection of the control to search for available help information presents a dialog box for submitting a query to the online community system.

17. The computing device of claim 16, wherein the context information indicates a focus of the application program that was recorded when the at least one specific application function was performed during the user interactions with the application program.

18. The computing device of claim 16, wherein:
the user input received by the application program is recorded in an un-do stack,
the commands processed by the application program are recorded in a command stack of the application program, and
automatically capturing context information comprises capturing information in the un-do stack and capturing information in the command stack.

19. The computing device of claim 16, wherein the memory further stores computer-executable instructions for receiving an audio narration provided by a user during the user interactions with the application program.

20. The computing device of claim 16, wherein generating searchable tag information further comprises at least one of:
generating the searchable tag information based on image processing of the video information, and
generating the searchable tag information based on audio portions of the video information.

* * * * *